(12) United States Patent
Ronin

(10) Patent No.: US 6,936,098 B2
(45) Date of Patent: Aug. 30, 2005

(54) PROCESS FOR PRODUCING BLENDED CEMENTS WITH REDUCED CARBON DIOXIDE EMISSIONS

(75) Inventor: Vladimir Ronin, Luleå (SE)

(73) Assignee: Procedo Enterprises Etablissement, Vaduz (LI)

( * ) Notice: Subject to any disclaimer, the term of this patent is extended or adjusted under 35 U.S.C. 154(b) by 134 days.

(21) Appl. No.: 10/426,915

(22) Filed: Apr. 30, 2003

(65) Prior Publication Data

US 2004/0089203 A1 May 13, 2004

(30) Foreign Application Priority Data

Nov. 7, 2002 (SE) .............................................. 0203287

(51) Int. Cl.⁷ .............................................. C04B 14/00
(52) U.S. Cl. ........................ 106/735; 106/739; 106/757
(58) Field of Search ................................ 106/735, 739, 106/757, 713

(56) References Cited

U.S. PATENT DOCUMENTS

| | | | |
|---|---|---|---|
| 5,804,175 A | 9/1998 | Ronin et al. ................. | 106/757 |
| 6,033,467 A | 3/2000 | Krofchak ..................... | 106/714 |
| 6,241,816 B1 * | 6/2001 | Ronin ......................... | 106/735 |
| 6,451,104 B2 | 9/2002 | Mehta ......................... | 106/705 |
| 6,733,583 B2 * | 5/2004 | Frailey et al. ............... | 106/705 |
| 2002/0000179 A1 | 1/2002 | Mehta ......................... | 106/707 |
| 2002/0129743 A1 | 9/2002 | Frailey et al. ............... | 106/705 |

FOREIGN PATENT DOCUMENTS

| EP | 0 696 262 B1 | 2/1996 |
|---|---|---|
| WO | WO 89/02878 A1 | 4/1989 |
| WO | WO 94/25411 A1 | 11/1994 |

\* cited by examiner

*Primary Examiner*—Paul Marcantoni
(74) *Attorney, Agent, or Firm*—Alfred J. Mangels

(57) ABSTRACT

A process for producing blended cement in which the cement contains Portland Cement mixed thoroughly with a microfiller, and possibly a water reducing agent, to provide a dry cement mixture, and fine supplementary cementitious materials selected from the materials blast furnace slag, fly ash, quartz, silica, amorphous silicon dioxide, limestone, and recycled concrete. The supplementary materials are first subjected to a grinding step in a dry state to a specific surface of at least 1000 $cm^2/g$ (Blaine). In a second step the ground supplementary materials are subjected to a grinding step together with at least 20% by weight of the total grinding mass of a highly reactive cement mixture in a dry state, to achieve a specific surface of at least 3000 $cm^2/g$ (Blaine).

11 Claims, 1 Drawing Sheet

PROCESS FOR PRODUCING BLENDED CEMENTS WITH REDUCED CARBON DIOXIDE EMISSIONS

BACKGROUND OF THE INVENTION

1. Field of the Invention

The present invention relates to a process for producing hydraulic blended cement with a significantly reduced Portland clinker minerals content and with a corresponding increased amount of supplementary materials.

2. Description of the Related Art

It is well known that each ton of production of Standard Portland Cement is accompanied by the release of about one ton of carbon dioxide, and that about half of that comes from the decarbonization of limestone in the kiln and the other half from energy consumption, primarily in the kiln.

It follows that the only way in which the cement industry can achieve meaningful reductions in carbon dioxide emissions is via the reduction of Portland clinker production and increased use of fillers. The cement industry does not believe that more than about 2–3% further reduction in energy consumption is possible in Standard Portland Cement production.

The traditional methods of production of blended cement include intergrinding Portland cement clinker with different types of microfillers, e.g., blast furnace slag, fly ash, limestone, etc., mainly in rotating ball mills. Such methods do not provide more than 20–25% of Portland clinker replacement by fly ash and approximately 30–50% by blast furnace slag, without significant negative influence on the cement performance, such as a decrease of setting time, very low strength development during the curing period 0–28 days, etc. It takes up to 3 times longer time (2–3 months) to achieve a 28-day strength of traditional Portland Cement concretes. At the same time, the high volume fly ash (HVFA) cements do have significant benefits in comparison with traditional Portland cements. Concretes produced with such cements are characterized by high durability, such as a low chloride permeability, a high sulphate and alkali-silica resistance, etc., see, e.g., Malhotra, Concrete International J., Vol. 21, No. 5, May 1999, pp. 61–66. According to Malhotra, strength development of such concretes could be improved by significantly increasing the content of a binder, such as cement+a microfiller, and significantly decreasing the amount of mixed water. But such an approach requires increased dosages of water-reduced admixtures to keep an acceptable consistency of the concrete mixtures, which sharply increases the cost of the concrete.

Another method related to the present invention is a method described by the US Patent Appln. Publ. No. US 2002/0000179, for a "Method for producing a blended cementitious composition". Said application suggests the introduction into the concrete mixtures of Portland Cement and traditional cementitious materials, such as fly ash, blast furnace slag, etc., and very fine and highly reactive rice hull ash. This gives an improvement of early age strength and chloride permeability of the concretes.

Such a method of producing concrete requires increased amounts, up to 400 kg per cubic meter, of a binder material, such as cement+fly ash+rice hull ash, in order to achieve a concrete which is comparable to Standard Portland Cement concretes at relatively low water-to-binder ratios, such as less than 0.40. These requirements result in significant technical and economical limitations for the application of that method by the ready mix concrete industry, which produces about 95% of the concrete with a cement/binder content of 250–300 kg per cubic meter and a water to cement ratio of 0.60–0.70. Introduction of that method for the mentioned concrete mix design leads to a drastic decrease of the concrete strength development and an increase of the setting time, which make it non-competitive with Standard Portland Cement concretes.

SUMMARY OF THE INVENTION

The present invention relates to a process for producing environmentally efficient blended cements with reduced carbon dioxide emissions for the preparation of concrete, where the cements contain Portland Cement mixed thoroughly with a microfiller, and probably a water reducing agent, to obtain a highly-active and dry cement mixture.

The present invention relates to a process for producing blended cement, where the cement contains Portland Cement mixed thoroughly with a microfiller, and possibly a water reducing agent, to a dry cement mixture, and fine supplementary cementitious materials selected from the materials blast furnace slag, fly ash, quartz, silica, amorphous silicon dioxide, limestone, and recycled concrete. The supplementary materials are subjected in a first step to grinding in a dry state to a specific surface of at least 1000 $cm^2/g$ (Blaine). In a second step the supplementary ground materials are subjected to a grinding together with at least 20% by weight of the total grinding mass of a highly reactive cement mixture in a dry state, to achieve a specific surface of at least 3000 $cm^2/g$ (Blaine). The highly reactive cement mixture contains cement and as an additional component at least one of an $SiO_2$-containing microfiller and a polymer in the form of a powdery water-reducing agent. The mixture will have been previously treated in a grinder with vibrating grinding media, in which the cement particles are subjected to a large number of impact impulses giving the cement particles an increase in surface energy and chemical reactivity.

The supplementary materials are subjected to a separate preliminary grinding to achieve a specific surface at least 1000 $cm^2/g$ (Blaine), and then to the joint grinding with at least about 20 weight percent, of the total grinding mass, of a highly reactive cement mixture to achieve a specific surface of at least 3000 $cm^2/g$ (Blaine). This results in an improvement of hydraulic reactivity in the event blast furnace slag is used. The improvement of chemical reactivity with calcium hydroxide is achieved in the case of the use of silica or other substances containing silicon dioxide. The improvement is due to the surface modification of the particles of the blend in the form of microdefects, microcracks, and dislocations caused by strain-induced dynamic transformations caused by the grinding process.

According to a very advantageous embodiment of the present invention, the highly reactive cement mixture has been manufactured according to a method disclosed in the European Patent No. 0 696 262.

It is, however, also possible to use a cement mixture that has been treated in accordance with a corresponding process so as to obtain a compressive strength corresponding to that recited in EP 0 696 262.

European Patent Specification No. EP 0 696 262 describes a method of producing cement that can be used to produce pastes, mortar, concrete, and other cement-based materials of high bearing capacity with reduced water content, high mechanical strength and density, and rapid strength development. That method includes the mechanical-chemical treatment of a mixture of cement and at least one of two components, wherein the first component is a microfill that contains silicon dioxide and the second component is a polymer in the form of a water reducing agent. The cement and the first and/or the second component are mixed in the first stage in a dry state, wherein the particles of the first and/or the second component are adsorbed on the cement particles. The mixture obtained in the first stage is treated in the second stage in a grinder with vibrating grinding media, in which the particles in the mixture are subjected to a large number of impact impulses that change directions in a rapid sequence, to thereby result in modification of the surface properties of the cement particles in the form of considerable increase in surface energy and chemical reactivity. The duration of treatment in the second stage is sufficient for a cement paste cube having a side length of 20 mm and compacted thoroughly under vibration and cured at +20 degrees C. under sealed conditions to obtain a one-day compressive strength equal to at least 60 MPa.

The European Patent No. 0 696 262 is hereby incorporated in the present patent application.

The present invention also relates to a method for producing a concrete mixture.

The method is used for preparing shaped concrete elements or structures, and comprises the steps of first producing a blended cement according to the above-described method and, second, mixing the blended cement with sand and/or aggregate of greater dimensions and water, and, third, casting a shaped element or the structure and hardening of the subject.

BRIEF DESCRIPTION OF THE DRAWING

The present invention will be described in greater detail in the following description, partly in connection with the drawing where.

DESCRIPTION OF THE PREFERRED EMBODIMENTS

Figure 1:
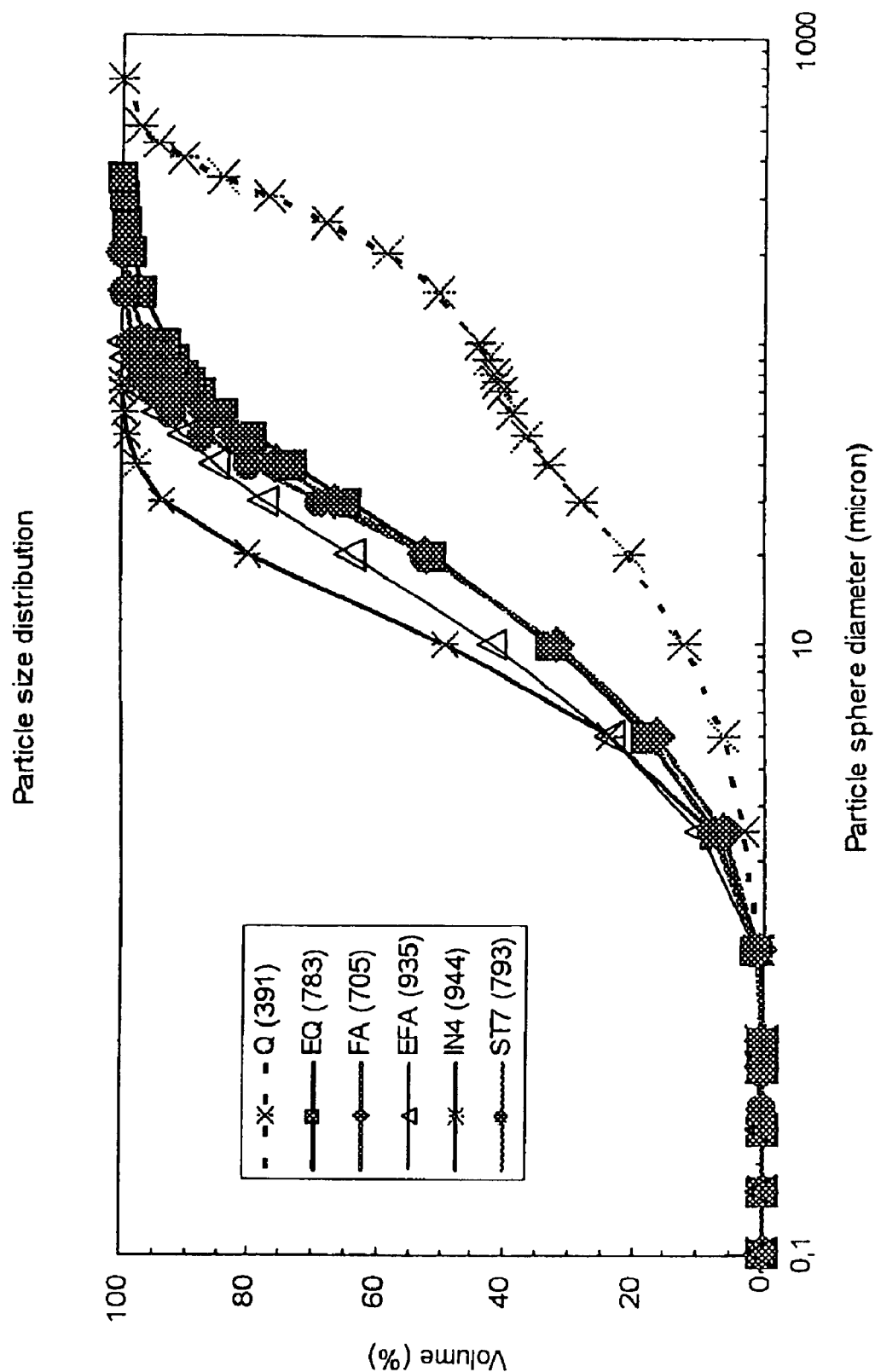
FIG. 1 is a diagram showing the average case for the particle size distribution of the blended cements produced according to the present invention, in comparison with traditional Portland Cements and in which the initial blend is subjected to grinding according to the present method. It shows that the specific surface of the blended cements is in line with the specific surface of the commercially produced pure Portland Cements.

Tables 1 and 2 below respectively show the strength development of the EN mortar, which is a European standard, having a cement-to-sand ratio of 1:3 and a water-to-binder ratio of 0.50, and concretes with the blended cements containing a high volume of fly ash and produced according to the present invention, and traditional blended cements.

Table 3 represents the strength development of the EN mortar (cement-to-sand ratio 1:3, and water-to-binder ratio 0.50) and concrete with blended cements containing a high volume of quartz filler and produced according to the present invention.

Table 4 represents the strength development of the EN mortar (cement-to-sand ratio 1:3, and water-to-binder ratio 0.50) with blended cements containing a high volume of blast furnace slag, produced according to the present invention, and traditional blended cement.

In Tables 4 and 5 HRC stands for Highly Reactive Cement, as, for example, cement treated according to EP 0 696 262.

Table 5 represents the test results from the testing, of chloride permeability (ASTM C 1202-94) of the concretes with blended cements containing a high volume of quartz filler, produced according to the present invention.

TABLE 1

Tests with fly ash for EN mortar (blended cement produced according to the present invention.

| Type of mixture | Compressive strength, MPa for Fly Ash, % by weight | | | |
|---|---|---|---|---|
| | 0 | 30 | 40 | 50 |
| EN-mortar | 18.6 | 23.8 | 18.6 | 14.4 |
| EN-mortar | 42.7 | 52.9 | 46.8 | 43.7 |
| Concrete* | 14.0 | 13.8 | 13.5 | 13.0 |
| Concrete* | 33.8 | 43.7 | 36.1 | 35.0 |

*represents concrete with a binder content of 300 kg/m$^3$ and a w/B ratio of 0.65

TABLE 2

Test with fly ash for EN Mortar (traditional blended cements)

| Cement type | Curing time, days | | |
|---|---|---|---|
| | 2 | 7 | 28 |
| 80% PC + 20% fly ash | 8.5 | 23.6 | 35.8 |
| 60% PC + 40% fly ash | 5.8 | 17.7 | 29.6 |

TABLE 3

Tests with quartz filler for EN mortar

| Type of mixture | Compressive strength, MPa for quartz filler, % by cement weight | | | |
|---|---|---|---|---|
| | 0 | 30 | 40 | 50 |
| EN-mortar, 2 days | 18.6 | 20.4 | 17.6 | 15.4 |
| EN-mortar, 28 days | 42.7 | 44.9 | 43.8 | 42.7 |
| Concrete*, 2 days | 14.0 | 13.8 | 13.5 | 13.0 |
| Concrete*, 28 days | 33.8 | 36.7 | 36.1 | 35.0 |

*represents concrete with a binder content of 300 kg/m$^3$ and a w/B ratio of 0.65

TABLE 4

Tests with blast furnace slag for EN mortar

| Type of mixture | Slag content, % | Compressive strength, MPa for curing time, days | | |
|---|---|---|---|---|
| | | 2 | 7 | 28 |
| 100% PC | 0 | 18.1 | 36.9 | 47.7 |
| 60% PC with slag (traditional blend) | 40 | 16.1 | 30.2 | 48.2 |
| 60% HRC with slag | 40 | 19.5 | 38.4 | 55.6 |
| 30% HRC with slag | 70 | 10.0 | 36.8 | 52.7 |
| 20% HRC with slag | 80 | 8.0 | 30.2 | 49.9 |

TABLE 5

Results from the testing of chloride permeability (ASTM C 1202-94)

| Mix No. | Binder type | w/b ratio | Average value of "charge passed" and (SD) (Coulombs) | Evaluation of chloride permeability |
|---|---|---|---|---|
| 1 | 100% PC | 0.45 | 3734 (165) | Moderate |
| 2 | 100% PC | 0.50 | 4030 (135) | High |
| 3 | 100% PC | 0.60 | 4828 (448) | High |
| 4 | 50% HRC + 50% quartz filler | 0.45 | 763 (62) | Very Low |
| 5 | 50% HRC + 50% quartz filler | 0.50 | 821 (39) | Very Low |
| 6 | 50% HRC + 50% quartz filler | 0.60 | 976 (106) | Very Low |

TABLE 6

Chemical composition

| Compound | PC | FA | BFS | Q |
|---|---|---|---|---|
| CaO | 62.4% | 15.0% | 35.5% | 0.1% |
| $SiO_2$ | 17.8% | 49.4% | 34.0% | 98.2% |
| $Al_2O_3$ | 4.0% | 19.6% | 11.5% | 0.2% |
| $Fe_2O_3$ | 3.9% | 5.2% | 0.4% | 0.3% |
| $SO_3$ | 3.2% | 0.8% | 3.4% | 0.1% |
| $Na_2O$ | <0.1% | 0.3% | 0.54% | 0.3% |
| $K_2O$ | 0.3% | 1.2% | 0.56% | 0.2% |

It has been discovered that when supplementary cementitious materials selected from the following group of materials, e.g., blast furnace slag, fly ash, quartz, silica or other substance containing amorphous silicon dioxide, etc., are first subjected to a separate preliminary grinding to achieve a specific surface at least 1000 $cm^2/g$ (Blaine), and, second, are subjected to joint grinding with at least about 20 weight percent of highly-reactive cement mixture to achieve a specific surface at least 3000 $cm^2/g$ (Blaine), the finally-obtained blended cement has significantly better performance than traditional blended cements. The better performance is a higher early-age and long-term strength development, a finer porosity, etc. It also has better performance than pure Portland Cement, such as a significantly higher environmental profile, a higher long-term strength development, a significantly lower chloride permeability, etc.

The above-mentioned grinding, both the separate and the joint stages, could be realized with the use of media milling equipment, e.g., tumbling ball mills, vibratory ball mills, planetary mills, stirred and centrifugal mills, and a non-media milling equipment, e.g., roller, jet mills, etc.

According to one preferred embodiment of the present invention the blended cement contains from 20% by weight up to 80% by weight of the highly reactive cement mixture.

According to a first embodiment the supplementary cementitbous material consists substantially of Class F fly ash.

According to a second embodiment the supplementary cementitious material consists substantially of Class C fly ash.

According to a third embodiment the supplementary cementitious material consists substantially of granulated blast furnace slag.

According to a fourth embodiment the supplementary cementitious material consists substantially of a quartz filler with a silicon dioxide content of at least 80% by weight.

According to ASTM C 618, fly ash is classified in two classes, Class C and Class F. Class F fly ash typically contains more than 70% by weight of silica, alumina, and ferric oxides, while Class C typically contains between 70% and 50%. Class F is produced as a by-product of the combustion of bituminous coal; Class C fly ash has a higher calcium content and is produced as a by-product of the combustion of sub-bituminous coal.

EXAMPLES

The following materials were used in these experiments: Standard Portland cement CEM I 42.5 according to EN-197, or Type I according to ASTM C 150, fly ash Class (FA), blast furnace slag (BFS), and quartz filler (Q). Chemical compositions of the materials are presented in Table 6.

The cementitious supplementary materials were subjected to separate grinding in the vibrating mill VBM 1518 to achieve a specific surface approximately 1500 $cm^2/g$ (Blaine).

Then the fillers were mixed in a dry state with a highly reactive dry cement mixture produced according to European Patent Specification No. EP 0696262 and containing 99% of PC and 2% of fly ash Class F. The mixing of the components was performed with a mixer called "Tonimix", manufactured in Germany, with a rotational speed of 280 rpm for 3 min. to obtain a homogeneous blend.

The blends were subjected to further grinding in a rotating ball mill to achieve the specific surface of about 4500 $cm^2/g$ (Blaine).

During those two subsequent grindings the particles of cementitious supplementary materials are subjected to a surface modification in the form of microdefects, microcracks, and dislocations caused by strain-induced dynamic transformations. Such effects lead to the improvement of hydraulic reactivity in the case where blast furnace slag is used, and improvement of chemical reactivity with calcium hydroxide in the case where silica or other substances containing silicon dioxide are used.

According to the test results, the blended cements produced according to the proposed invention have specific surfaces in line with Standard Portland Cements, see FIG. 1, and the properties related to strength development and durability are significantly better than for traditional blended cements and pure Portland Cements, see Tables 2–5.

FIG. 1 shows the particle size distribution for the blended cements produced according, to the proposed grinding method, and the particle size distributions for the blends before grinding. In that regard, the following notations apply to FIG. 1:

Q stands for a reference blend of Standard Portland Cement and quartz (filler <1 mm), ratio 50/50 by weight.

EQ stands for the blend of Standard Portland Cement and quartz filler (50/50) interground according to the EMC method. FA stands for a reference blend of Standard Portland Cement and Class F fly ash, ratio 50/50 by weight.

EFA stands for a blend of Standard Portland Cement and Class F fly ash, ratio 50/50 by weight interground according to the EMC method.

ST7 stands for Standard Portland Cement (Type I according to ASTM C 150).

IN4 stands for rapid hardening Portland cement (type III according to ASTM C 150 with higher fineness).

Calculated surfaces in $m^2$/liter are in brackets behind the legends.

Due to a significant reduction of Portland clinker content, implementation of such blended cements could significantly reduce the level of carbon dioxide and other "greenhouse" gas emissions, where the reduction could be more than 50%, as well as reducing the amount of energy required for Portland clinker production.

What is claimed is:

1. A process for producing blended cement, wherein the cement contains Portland Cement that has been mixed thoroughly with a microfiller and optionally a water reducing agent to a dry cement mixture, and that also includes a fine supplementary cementitious material selected from the group consisting of blast furnace slag, fly ash, quartz, silica, amorphous silicon dioxide, limestone, recycled concrete, and mixtures thereof, said process comprising the steps of: subjecting the supplementary material to a first grinding step while in a dry state to provide a Blaine specific surface of at least 1000 $cm^2/g$, grinding the ground supplementary material in a second grinding step together with at least 20% by weight of a total grinding mass of a highly reactive cement mixture in a dry state to achieve a blended cement having a Blaine specific surface of at least 3000 $cm^2/g$, wherein the highly reactive cement mixture contains cement particles and at least one of the components selected from the group consisting of an $SiO_2$-containing microfiller and a polymer in the form of a powdery water-reducing agent, and wherein the highly reactive cement mixture is first treated in a grinder with vibrating grinding media in which the cement particles are subjected to impact impulses giving the cement particles an increase in surface energy and chemical reactivity.

2. A process according to claim 1, wherein the highly reactive cement mixture is obtained by mixing in a first stage a dry state cement and a component selected from the group consisting of a microfiller that contains silicon dioxide and a polymer in the form of a water reducing agent, wherein particles of the component are adsorbed on the cement particles, and treating the mixture obtained in the first stage in a second stage in a grinder with vibrating grinding media in which particles in the mixture are subjected to impact impulses which change directions in a rapid sequence to result in modification of surface properties of cement particles in the form of increased surface energy and chemical reactivity.

3. A process according to claim 1, wherein the blended cement contains from 20% by weight up to 80% by weight of said highly reactive cement mixture.

4. A process according to claim 1, wherein the supplementary cementitious material consists essentially of Class F fly ash.

5. A process according to claim 1, wherein the supplementary cementitious material consists essentially of Class C fly ash.

6. A process according to claim 1, wherein the supplementary cementitious material consists essentially of granulated blast furnace slag.

7. A process according to claim 1, wherein the supplementary cementitious material is substantially a quartz filler with a silicon dioxide content of at least 80% by weight.

8. A method for producing a concrete mixture, said method comprising the steps of:

subjecting a supplementary material selected from the group consisting of blast furnace slag, fly ash, quartz, silica, amorphous silicon dioxide, limestone, recycled concrete, and mixtures thereof to a first grinding step while in a dry state to provide a Blaine specific surface of at least 1000 $cm^2/g$, grinding the ground supplementary material in a second grinding step together with at least 20% by weight of a total grinding mass of a highly reactive cement mixture in a dry state to achieve a blended cement having a Blaine specific surface of at least 3000 $cm^2/g$, wherein the highly reactive cement mixture contains cement particles and at least one of the components selected from the group consisting of an $SiO_2$-containing microfiller and a polymer in the form of a powdery water-reducing agent, and wherein the highly reactive cement mixture is first treated in a grinder with vibrating grinding media in which the cement particles are subjected to impact impulses giving the cement particles an increase in surface energy and chemical reactivity; and mixing said blended cement with a material selected from the group consisting of sand and other aggregates, and water.

9. A method according to claim 8, including the step of adding a water reducing agent to the blended cement.

10. A method according to claim 8, including the step of adding an air entraining additive to the blended cement.

11. A method according to claim 8, wherein the sand and other aggregates have particle sizes larger than the cement particles.

* * * * *